Patented Aug. 17, 1937

2,090,452

UNITED STATES PATENT OFFICE 2,090,452

TRANSPARENT MOLDED ARTICLE FROM CASEIN AND UREA-FORMALDEHYDE-CONDENSATION PRODUCTS

Max Landecker, Wuppertal-Barmen, Germany, assignor to the firm Pfenning-Schumacher-Werke G. m. b. H., Wuppertal-Barmen, Germany No Drawing. Application June 7, 1934, Serial No. 729,498. In Germany June 13, 1933

6 Claims. (Cl. 106—22)

It is known that casein can be used as a filler for urea-formaldehyde condensation products and that these powders can be molded to form articles which are impervious to light or cloudy and opalescently translucent.

Furthermore it is known that casein can be deprived of its fat, either chemically or by means of extraction. The chemical way consists, as is known, in treating the casein in dilute alkaline solutions allowing the solution to settle, filtering off the muddy residue and precipitating from the filtrate the casein which is now freed from the small milk-fat content. This casein however has usually lost its good qualities as a raw-material for artificial horn.

The extraction method consists in extracting the milk-fat by means of hot solvents, especially ethyl-alcohol.

According to the present invention, the opalescent cloudy appearance of the molded bodies can be avoided and in lieu of it an appearance almost as clear as glass can be obtained by treating such caseins where completely freed of fat with condensation products of urea-formaldehyde. Thereby a moldable powder is obtained, by the compression of which molded objects will result which, depending upon the proportion of casein to the condensation product of urea-formaldehyde, show from translucency with a slight yellowish tint to almost colorless transparency.

The fact that fat-deprived casein as a filler mixed with resinous urea-formaldehyde-condensation products would yield products of a very good transparency which opens these products to a new and wide field of commercial use, could not be foreseen as a molding powder of that kind, moistened with the quantity of water which is necessary to produce useful moldings of fat-deprived casein, will not mold properly under heat and pressure. On the other hand molded articles of increased transparency and of good quality will be obtained from a mixture of air-dried fat-deprived casein and aminoplast condensation products when molded under the conditions of aminoplast-condensation products, i. e. with a small quantity of moisture, much too small to mold fat-deprived casein by itself.

Furthermore it is known that casein is partly dissolved by the action of an urea solution and thus decomposed into amino-acids which exercise a strong influence in the direction of the way in which the re-action between urea and formaldehyde will take place. As a consequence a condensation between fat-deprived casein, urea and formaldehyde could in so far just easily lead to products having a cloudy opalescent appearance, since it is known that condensations of this kind between urea and formaldehyde, in presence of acids, can lead also to methylene-urea compounds, i. e. to opaque products.

Ureaformaldehyde resins containing commercial casein as a filler produce turbid, that is non-transparent moldings. This turbidness is due to the milk-fat which is always contained in commercial casein. Molded pieces of this kind look like imitations of milk-glass or of porcelain. The milk-fat plays, therefore, the role of a turbid making ingredient, in other words, that of an opaque filler disturbing the transparency, as it will be the case if, for instance, celluloid is mixed with small quantities of lithopone or titanium oxide. Contrary to this are the moldings from the urea-resin-type which carry fat-deprived casein as filler; these moldings show no turbidness at all. One can look through the piece, for instance, one can read writing through it, it has the physical character which the man of the street uses to call "transparent". One may divide perhaps the transparency into different grades, but at all events, the ureaformaldehyde - resin - products made by means of casein deprived of its fat are transparent if compared with those turbid and non-transparent moldings which contain as a filler the usual commercial casein, i. e. fat-containing casein.

Furthermore, considering the fact that a molding powder, consisting of fat-deprived casein combined with a translucent phenol-formaldehyde-condensation product will yield opaque articles only, the contrary effect in producing moldings of a good transparency from a mixture of fat-deprived casein and with aminoplast-condensation-products could not be foreseen.

As the products thus obtained show good physical qualities, these molding powders represent a very useful enrichment in the field of artificial resins-molding-powders for the production of articles of a good transparency of any kind.

Examples

1. For instance, 1 kg. of acid casein is fat-deprived with ethyl-alcohol and usually will become somewhat yellowish or reddish through the degreasing process. This is boiled with a solution of 1 kg. urea in 2½ ltr. 40% formaldehyde, this latter having been just neutralized. This mixture will thicken noticeably, and after a short boiling will form a gelatine containing the casein in a highly soaked condition. After drying and pulverizing the molding powder can be molded under 250 kg. specific pressure at a temperature of 135° C., cooled down under pressure and taken out of the mold in cold condition. The molded articles obtained thereby are of a good transparency and light-yellowish.

2. 1 kg. of rennet-casein which has been deprived of its fat as described in Example 1. The casein powder the color of which will vary being of somewhat reddish color on account of the degreasing process, is handled as described above after having been dried. In this case a pasty, sticky mass is formed, which will be handled just as Example 1.

3. 1 kg. of rennet-casein is mixed with a cold solution of 1 kg. urea and 2.8 ltr. 40% formaldehyde. The mixture is allowed to stand for 24 hours in cold condition and changes to an elastic mass which is dried and handled like Example 1.

These examples are to be taken only as a line of directions for the production of condensation products. Proportions of the ingredients and the temperatures used in the manufacture of the mixture can be varied in wide limits. Colors and ingredients, known in this art, for example softeners and catalyzers may be added.

I claim:

1. That process for producing a molded article which comprises subjecting casein to a degreasing operation sufficient to remove practically all milk fat, mixing the fat-deprived casein with a mixture of urea and formaldehyde substantially in the proportions of 1 kg. of urea to about 2½ litres of 40 to 45 per cent formaldehyde, drying and pulverizing the mixture, and subjecting a quantity of the mass to heat and pressure to form an article transmitting more light than a similar article having fat containing casein therein.

2. That process for producing a molded article which comprises subjecting casein to a degreasing operation sufficient to remove practically all milk fat, mixing the fat-deprived casein with a mixture of urea and formaldehyde substantially in the proportions of 1 kg. of urea to about 2½ litres of 40 to 45 per cent formaldehyde, boiling the mixture until it assumes a gelatinous consistency, drying and pulverizing the mixture, and subjecting a quantity of the mass to heat and pressure to form an article transmitting more light than a similar article having fat containing casein therein.

3. That process for producing a molded article which comprises subjecting casein to a degreasing operation sufficient to remove practically all milk fat, mixing the fat-deprived casein with a mixture of urea and formaldehyde substantially in the proportions of 1 kg. of urea to about 2½ litres of 40 to 45 per cent formaldehyde, allowing the mixture to stand about twenty-four hours in cold condition, drying and pulverizing the mixture, and subjecting a quantity of the mass to heat and pressure to form an article transmitting more light than a similar article having fat containing casein therein.

4. A process of making molded articles comprising partially condensing urea and an aldehyde in the presence of fat-free casein, and molding the condensation product under heat and pressure to complete the condensation and produce an article transmitting more light than a similar article having fat-containing casein therein.

5. The method of preparing molded articles which comprises treating casein with hot milk fat solvent to extract milk fat from the casein, mixing the casein after removal of the milk fat with a solution of urea and formaldehyde, heating the mass to effect a condensation reaction between the urea and the formaldehyde and molding the condensation product under heat and pressure to produce an article transmitting more light than a similar article having fat-containing casein therein.

6. The product produced by the process of claim 4.

MAX LANDECKER.